United States Patent
Pennarun

(10) Patent No.: US 9,290,677 B2
(45) Date of Patent: Mar. 22, 2016

(54) COATING WAX BASED ON COPOLYMERS, USES THEREOF AND PROCESS FOR PREPARING SAME

(75) Inventor: Pierre-Yves Pennarun, Vendome (FR)

(73) Assignee: FROMAGERIES BEL, Paris (FR)

( * ) Notice: Subject to any disclaimer, the term of this patent is extended or adjusted under 35 U.S.C. 154(b) by 184 days.

(21) Appl. No.: 13/637,862

(22) PCT Filed: Mar. 30, 2011

(86) PCT No.: PCT/FR2011/050714
§ 371 (c)(1),
(2), (4) Date: Dec. 10, 2012

(87) PCT Pub. No.: WO2011/121239
PCT Pub. Date: Oct. 6, 2011

(65) Prior Publication Data
US 2013/0156901 A1    Jun. 20, 2013

(30) Foreign Application Priority Data
Mar. 31, 2010 (FR) ...................... 10 52404

(51) Int. Cl.
| | |
|---|---|
| *A23B 4/10* | (2006.01) |
| *C09D 191/06* | (2006.01) |
| *A01J 27/02* | (2006.01) |
| *A23C 19/16* | (2006.01) |
| *A23L 1/00* | (2006.01) |
| *C08F 293/00* | (2006.01) |
| *C08L 53/00* | (2006.01) |
| *C09D 131/02* | (2006.01) |
| *C09D 153/00* | (2006.01) |

(52) U.S. Cl.
CPC ............... *C09D 191/06* (2013.01); *A01J 27/02* (2013.01); *A23C 19/163* (2013.01); *A23L 1/0064* (2013.01); *C08F 293/00* (2013.01); *C08L 53/00* (2013.01); *C09D 131/02* (2013.01); *C09D 153/00* (2013.01)

(58) Field of Classification Search
CPC .... C08L 53/00; C09D 153/00; C09D 131/02; C09D 191/06; C08F 293/00; A01J 27/02
USPC .................. 426/125, 307, 512, 130; 106/243
See application file for complete search history.

(56) References Cited

U.S. PATENT DOCUMENTS

| | | | |
|---|---|---|---|
| 7,312,272 B2 | 12/2007 | Jakob et al. | |
| 2005/0107515 A1* | 5/2005 | Jakob et al. | ................... 524/503 |

FOREIGN PATENT DOCUMENTS

| | | |
|---|---|---|
| EP | 1 917 862 A1 | 5/2008 |
| WO | WO 2007/101909 A1 | 9/2007 |
| WO | WO 2009/016239 A1 | 2/2009 |
| WO | WO 2009/047332 A2 | 4/2009 |

OTHER PUBLICATIONS

International Search Report for International Application No. PCT/FR2011/050714, dated Jul. 22, 2011.

* cited by examiner

*Primary Examiner* — Jyoti Chawla
(74) *Attorney, Agent, or Firm* — Davidson, Davidson & Kappel LLC

(57) ABSTRACT

The present invention concerns a coating wax for food product, comprising at least one block copolymer formed of at least one block polymer (A) derived from the polymerization of at least two monomers ($M_A$), the same or different, derived from long chain fatty acids, the said long chain comprising 14 to 34 carbon atoms; and of at least one block polymer (B), different from (A), derived from the polymerization of at least two monomers ($M_B$), the same or different, derived from short chain fatty acids.

22 Claims, No Drawings

COATING WAX BASED ON COPOLYMERS, USES THEREOF AND PROCESS FOR PREPARING SAME

This application is a U.S. national phase application under 35 U.S.C. §371 of International Application No. PCT/FR2011/050714, filed on Mar. 30, 2011 which claims priority to French Patent Application No. 10 52404, filed Mar. 31, 2010, the disclosures of which are hereby incorporated by reference herein.

FIELD OF THE INVENTION

The subject of the present invention is a novel coating composition in the form of a coating wax for cheeses in particular. A further subject is the process for preparing said composition, a method for coating products with this composition and the food products thus coated.

BACKGROUND OF THE INVENTION

Some cheeses, more particularly firm cheeses are packaged under a protective coating firstly to prevent drying of the cheeses during their storage and marketing, and secondly to prevent deterioration of the cheeses by microorganisms.

With the exception of coatings in synthetic plastic materials, of vinyl acetate polymer type, waxes are the coating materials the most frequently used.

Waxes of different origins are used for this purpose. Hydrocarbon waxes of petroleum origin are widely used; they are formed of a mixture of paraffins, microcrystalline waxes and optionally mineral oils. This type of coating and its method of application are described in patent application FR 1 453 977.

These coating materials, in particular coating waxes, must have plasticity and malleability, must not be brittle or adhere to the cheese when they are removed for consumption of the cheese.

In addition, these coating materials, in particular coating waxes, must have melt properties. They are liquid at cheese coating temperatures by immersion or spraying (40 to 100° C.). They are waxy and solid at ambient temperature after crystallization of their constituents.

While the hydrocarbon waxes the most frequently used have excellent functional properties and meet every aspect of the above criteria, they nevertheless have a non-negligible environmental impact since, firstly, they are derived from non-renewable resources and secondly, at the time of their incineration or biodegradation (compost), they produce greenhouse gases contributing towards global warming.

Numerous authors have sought to find substitute compounds; mention may be made of coatings in the form of waxes formed of fatty acid mono- and di-glycerides which, compared with hydrocarbon waxes, have defects at ambient temperature. These substitute products:
- have lesser mechanical resistance to impacts,
- sometimes have a brittle nature with a tendency to flake when removed for consumption of the product, more particularly when a pull-off strip (Tircel®) is used to open the coating; this is all the more the case since a high fraction of crystalline products is used at high melt temperature, such as long chain fatty acids for example,
- are sometimes sticky or oily to the touch for products obtained from shorter fatty acids for example whose melt temperature is lower than 40° C.,
- are sometimes less resistant to outside attack by microorganisms for example (lipolysis).

Although some of these coatings, in particular in the form of waxes, exhibit good plastic properties at ambient temperature, a less favourable behaviour of these coatings is nevertheless ascertained at higher or lower temperatures to which they may be subjected throughout the cheese distribution cycle. For example, some products appear too brittle at temperatures of the order of 4° C. whereas others have a very sticky nature with the onset of oiling, adhesion to outer packaging, possible migration of colouring agents or of the glycerol components of the packaging. In addition, the constituents of these coatings have a chemical structure very close to that of cheese triglycerides and have a low molecular weight which may promote their possible migration to and miscibility with the cheese.

To overcome these problems some coating compositions use polymers of fatty acid vinyl esters as water-dispersible coatings. This type of coating and its method of application are described in patent EP 2 044 836. The final product is coated with a film of thickness less than 500 µm, and more particularly less than 100 µm.

However these products do not have the properties required for a coating wax in terms of fusion/crystallization for the coating operation, impact resistance and ease of peel-off removal prior to consumption. Like any coating they are removed by peeling and the depositing of these aqueous dispersions on the surface of cheeses requires a drying operation. In addition, this coating process is included in the very process of cheese ripening and is therefore not strictly speaking intended for the preservation and transport of cheeses.

To improve the peel-off capability and reduce the tacky nature of the coating, some coating compositions use a mixture of a copolymer of vinyl acetate, dibutyl maleate and wax. This type of coating and its method of application are described in international application WO 2007/116020. While the peel-off quality of the coating is distinctly improved, these compositions are also obtained however from aqueous dispersions of copolymers and therefore require a drying phase.

Coating compositions containing block copolymers have also been described.

WO 2009/016 239 describes a composition containing materials consisting of at least two blocks of vinyl monomers of which at least one can be crystallized. These polymers are manufactured in solution using a particular polymerization method called RAFT. This composition of polymers is used in an aqueous dispersion to provide coatings in the form of crystallizable films used as films or surface coatings e.g. metallic or plastic. The coating composition in WO 2009/016 239 is not suitable for providing a coating wax, all the more so a coating wax for food products. In addition the RAFT method uses non-negligible quantities of sulfur compounds known to be highly odorous and hence incompatible for food use. The migration of these compounds in the food product would lead to organoleptic defects.

WO 2009/065 749 describes a polymer compound used as additive in plastic compositions. This polymer is solubilized in a reactive monomer liquid at ambient temperature to be integrated in another polymeric composition. This polymer is not used alone. It is in no way intended to be used as food coating since in this case a final chemical conversion of this polymer would be necessary directly on the product to be coated, which appears to be highly improbable in practice.

Wax of fossil origin therefore remains the solution of most interest at the present time, and hence the most used for coating food products.

SUMMARY OF THE INVENTION

The object of the present invention is to provide a coating composition for a food product having satisfactory physicochemical and functional characteristics.

A further object of the invention is to provide a coating wax for a food product having satisfactory physicochemical and functional characteristics.

A further object of the present invention is to provide a coating composition for a food product with which it is possible to overcome the above-mentioned disadvantages related to hydrocarbon waxes, in particular regarding costs and harming of the environment.

The present invention therefore concerns a novel coating composition for a food product, in particular a coating wax for a food product, in particular a cheese and more particularly a firm cheese, comprising at least one block copolymer composed of at least one block polymer (A) derived from the polymerization of at least two monomers ($M_A$), the same or different, derived from long chain fatty acids comprising 14 to 34, more particularly 14 to 22, further particularly 14 to 18 carbon atoms, and of at least one block polymer (B), different from (A), derived from the polymerization of at least two monomers ($M_B$), the same or different, derived from short chain fatty acids, more particularly comprising 2 to 16 carbon atoms.

DETAILED DESCRIPTION

In the present invention, the term <<coating composition>> designates a coating wax.

In the present invention by <<coating wax>> is meant a mixture malleable at ambient temperature (typically between 15 and 30° C.), generally containing polymers and/or molecules comprising 5 to 50 carbon atoms, whose essential properties are hydrophobicity, water vapour barrier properties, a melt temperature higher than ambient temperature i.e. generally higher than 35° C., and low viscosity in the molten state. The coating wax of the invention is removed by perling off before consumption of the coated food product.

In addition, the coating wax of the invention has sufficiently low viscosity in the molten state to allow the coating of food products, essentially by immersion or by spraying. When used for a food product coating operation, the coating wax of the invention is never at any time dispersed in water.

The coating wax of the invention is insoluble in water.

The coating wax of the invention has a much reduced water content, generally less than 10%, preferably less than 5%, more preferably less than 1% by weight relative to the total weight of the coating wax.

Preferably the coating wax of the invention does not contain any water.

In the present invention, by long chain is meant a saturated alkyl chain of straight-chain or branched type comprising at least 14 carbon atoms.

In the present invention, by short chain is meant a saturated alkyl chain of straight-chain or branched type comprising fewer than 16 carbon atoms.

By <<block copolymer>> is meant a $(M_A)_n$-$(M_B)_m$ polymer formed of at least two homopolymers $(M_A)_n$ and $(M_B)_m$ linked by covalent bonds; n and m being integers greater than 1. Each block (homopolymers $(M_A)_n$ or $(M_B)_m$) is derived from the polymerization of a single type of monomer (($M_A$) or ($M_B$)).

By monomers derived from a fatty acid or monomers derived from a functionalized fatty acid (FFAM=Functionalized Fatty Acid Monomers) is meant monomers derived from fatty acids (and/or their derivatives) functionalized by grafts containing a double ethylene bond C=C. They are obtained from saturated fatty acids and/or their derivatives such as alcohols or ethers, which are straight-chain or branched. The saturated fatty acids and their derivatives are derived from compounds of natural origin (food fats for example) or after a total hydrogenation step of unsaturated fatty acids, or after chemical conversion of the carboxylic acid functions of fatty acids (alcohols and ethers). FFAMs therefore contain an ethylene function which is substituted at least once by a fatty acid or fatty acid derivative.

FFAMs are preferably but not exclusively obtained from the fatty acids present in vegetable fats since these have physicochemical properties close to those of mineral wax, whilst being widely available and renewable. Another source of fatty acids, which is given minority use in the present wax on account of its non-renewable nature, concerns the oxidation of paraffins and related products such as mineral oils (short chain hydrocarbons comprising fewer than 25 carbon atoms, or hydrogenated cyclic hydrocarbons). This source will solely be used for modifying those physicochemical properties which cannot be obtained with renewable FFAMs. Finally, another source of fatty acids is obtained by oxidation of paraffin or synthetic polyethylene wax preferably obtained from renewable raw materials (biomass methane for example). These FFAMs are obtained from unsaturated, straight-chain or branched fatty acids or alcohols of variable carbon chain length advantageously between 2 and 22 carbon atoms inclusive; however fatty acids or alcohols having carbon chains of longer length (up to more than 34 carbons) can be used. As examples of straight-chain fatty acids which can be functionalized, mention can be made of acetate (C2), dodecanoate (C12) or stearate (C18); as examples of branched fatty acids which can be functionalized, mention can be made of mixtures of isomers such as neododecanoate (C12), neodecanoate (C10), neononaoate (C9), or neooctanoate (C8); as examples of fatty alcohols mention can be made of ethanol (C2), butanol (C4), dodecanol (C12), hexadecanol (C18).

The applicant has shown in fully unexpected manner that a mixture of polymers obtained from FFAMs has physical (melt) and mechanical (crystallinity rate) properties that are equivalent to those of a coating wax for cheese and enabling it to be used as such. It has also shown that this material additionally has all the capabilities of product protection, impact resistance and peel-off quality essential for use as a cheese coating.

The applicant has effectively shown that a product derived from the copolymerization of FFAM blocks in suitable proportions allows substances to be obtained that are liquid at cheese coating temperatures by immersion or spraying and solid at ambient temperature after crystallization of these blocks.

In the present invention, the term cheese designates any cheese that is sufficiently firm to be coated i.e. having a dry extract higher than 45%, whether derived from:
  a first transformation directly from whole or skimmed milk or a mixture of both; the milk being in liquid or reconstituted powder form, liquid milk concentrates or reconstituted powder form,
  or a second transformation by melt treatment or a process according to patent application FR 2 778 821 or equivalent processes.

The milk fat can be replaced therein in full or in part by vegetable fat.

Among the cheeses marketed in a coating mention can be made of pressed cheese of Gouda, Edam, Cheddar type, or fresh pasta filata cheese (e.g. mozzarella) but also firm processed cheeses.

According to one preferred embodiment, the monomers ($M_A$) and ($M_B$) meet the following general formula (I):

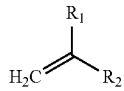
(I)

in which:

$R_1$ is a hydrogen atom, or a straight-chain or branched alkyl chain comprising 1 to 6 carbon atoms;

$R_2$ is a group $(CH_2)_p$—$OCOR_3$, $(CH_2)_p$—$OR_4$ or $COOR_5$ with p=0 or 1; $R_3$, $R_4$ and $R_5$ being the same or different and representing branched or straight-chain alkyl chains derived from saturated fatty acids.

For ($M_A$), the alkyl chain of the groups $R_3$, $R_4$ and $R_5$ comprises at least 14 carbon atoms. For ($M_B$), the alkyl chain of the groups $R_3$, $R_4$ and $R_5$ comprises no more than 16 carbon atoms.

The invention particularly concerns a novel coating composition for cheese, typically a coating wax, formed of at least one block polymer (A) derived from the polymerization of a monomer ($M_A$) pure or in a mixture chosen from among the following FFAMs: vinyl ester of fatty acid(s), and/or acrylate of fatty alcohol(s), and/or methacrylate of fatty alcohol(s), and/or allyl ester of a fatty acid, and/or allyl ether of a fatty acid or alcohol, and/or a vinyl ether of a fatty acid or alcohol; and of at least one block polymer (B) derived from the polymerization of a pure monomer ($M_B$) or of a mixture of monomers chosen from among the families cited for block (A), this monomer or mixture of monomers in block (B) being different from (A).

Among the preferred monomers ($M_A$) and ($M_B$), the monomers of the following formulas can be cited in particular:

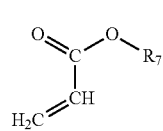
(a)

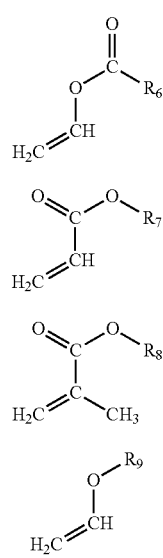
(b)

(c)

(d)

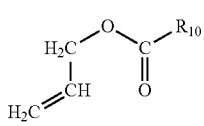
(e)

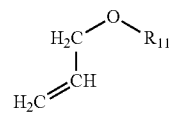
(f)

Formula (a) represents a fatty acid vinyl ester, formula (b) represents a fatty alcohol acrylate, formula (c) represents a fatty alcohol methacrylate, formula (d) represents a vinyl ether, formula (e) represents a fatty acid allyl ester and formula (f) represents an allyl ether.

In formulae (a) to (f), the groups $R_6$ to $R_{11}$ represent branched or straight-chain alkyl chains derived from saturated fatty acids such as defined above.

Preferably, the block polymers (A) are obtained from monomers ($M_A$) derived from long chain fatty acids such as vinyl stearate, vinyl behenate, stearyl methacrylate, behenyl methacrylate, stearyl acrylate or behenyl acrylate for example.

Preferably, the monomers ($M_A$) are vinyl esters of long chain fatty acids of formula (a), such as vinyl stearate for example.

Preferably, the monomers ($M_A$) are long chain, fatty alcohol acrylates of formula (b), such as stearyl acrylate for example.

The long chain polymers (A) are preferably crystalline at ambient temperature.

According to one preferred embodiment, the block polymers (B) are obtained from monomer(s) ($M_B$) derived from short chain fatty acids, such as vinyl dodecanoate, vinyl acetate or dodecyl acrylate for example, or having a branched chain such as vinyl neodecanoate for example.

Preferably, the monomers ($M_B$) are vinyl esters of short chain fatty acids of formula (a), such as vinyl dodecanoate for example, alone or in a mixture with vinyl neodecanoate.

Preferably, the monomers ($M_B$) are acrylates of short chain fatty alcohols of formula (b), such as dodecyl acrylate for example.

The short chain (B) polymers are preferably amorphous at ambient temperature and at the cool storage temperature (2-8° C.).

According to one advantageous embodiment, the coating composition of the invention is obtained by synthesis of blocks of monomers in defined proportions of a monomer ($M_A$) and a monomer ($M_B$) of between 5:95 to 95:5, advantageously from 20:80 to 80:20, preferably from 30:70 to 70:30 and more preferably 40:60 to 60:40.

To reduce the risk of migration during coating, it is preferred to use block copolymers with the highest possible molecular weight, in particular higher than 1000 Da and lower than 100 000 Da, more particularly lower than 50 000 Da, and more preferably lower than 30 000 Da.

According to one particular embodiment, the coating composition of the invention may further comprise an additive whose weight proportion is less than 30% of the total weight of the composition.

By additive is notably meant the salts of fatty acids (E470), or esters of fatty acids such as the mono- and diglycerides of fatty acids (E471), the esters of fatty acids (E472), the sucrose esters of fatty acids (E473), the sucroglycerides (E474), the polyglycerol esters of fatty acids (E475), the esters of sorbitan fatty acids (E491 to E495) such as sorbitan tristearate for example. By additive is also meant waxes of natural origin such as beeswax (E901), candelilla wax (E902), carnauba wax (E903), Shellac (E904). By additive is also meant, but less preferably, the waxes of fossil origin, hence non-renewable, such as microcrystalline wax or paraffin wax.

The invention also concerns a composition, typically a coating wax, obtained from a multi-block copolymer formed of at least 2 monomers (copolymer ABA obtained from monomers ($M_A$) and ($M_B$)) or more than 2 monomers (copolymer ABC for example for a polymer synthesized from monomers ($M_A$), ($M_B$) and ($M_C$)). The monomer ($M_C$) used for the synthesis of this polymer can be chosen from one same chemical family (vinyls, acrylates, methacrylates, maleates, allyls) or from different families, or this monomer may even be mono, di, tri or quadri substituted by fatty acids and derivatives.

The invention also concerns the process for preparing a coating composition such as defined above, essentially comprising polymerization steps of the monomer bocks ($M_A$) and ($M_B$). The copolymer blocks can be prepared by successively adding the monomers forming the successive blocks ($M_A$) and ($M_B$). The conducting of more specific syntheses can also be envisaged. Therefore, the adding of transfer agents to the reaction medium at the end of the synthesis can allow a reduction in the mean molecular weights. Among the transfer agents mention can be made of thiols, disulfides, halocarbons, some vinyl ethers, some solvents such as tertiary alcohols, toluene or chloroform. The transfer agents can be removed by hot or vacuum evaporation during deodorizing steps. Finally, the initiator itself or another initiator can ensure this function when added at the end of the reaction. These transfer agents and methods of use are well known to the person skilled in the art, such as in the field of poly(ethylene-co-vinyl acetate) polymers.

The polymerization mode which is preferably adopted is the one which consists of producing a polymer with controlled architecture and molecular weight. Among these architectures, mention may be made for example of straight-chain copolymers, comb copolymers, star copolymers or hyper-branched dendritic copolymers. These controlled architectures and molecular weights are obtained by living polymerization reactions such as anionic, cationic or controlled radical polymerization (CRP). Among these synthesis modes, atom transfer radical polymerization (ATRP), or Reversible Addition-Fragmentation Chain Transfer (RAFT) or Nitroxide Mediated Polymerization (NMP), allow the producing of multi-block copolymers with low molecular weight.

The polymerization reaction preferably takes place by heat initiation of a radical initiator or in the presence of anionic or cationic initiator. The radical initiators the most frequently used belong to the family of organic peroxides (diacyl peroxides, dialkyl peroxides, hydro-peroxides, ketone peroxides, dicarbonate peroxides, peroxyesters); mineral radical initiators are also available such as for example di-iodine ($I_2$) or sodium, potassium or ammonium persulfates. However anionic initiators (hydroxides, alcoholates, carbanions such as the butyl anion in butyl lithium) or cationic initiators (acid, carbocations, ammonium), even direct light can be used to initiate the reaction. Amongst all these initiators, preference is given to radical initiators derived from renewable resources such as dimyristyl peroxydicarbonate (CAS N° 53220-22-7), didecanoyl peroxide (CAS N° 762-12-9), dicetyl peroxydicarbonate (CAS N° 26322-14-5), di(n-propyl) peroxydicarbonate (CAS N° 16066-38-9) or dilauroyl peroxide (CAS N° 105-74-8) whose main constituents are derivatives of the fatty acids.

Radical polymerization is conducted at a temperature of between 50° C. to 200° C. depending on the initiator used and the desired kinetics of the reaction. A reaction temperature higher than the melt temperature of the monomers and polymer obtained is preferably used i.e. higher than 50° C.; a temperature as low as possible is preferably used to reduce the risks of degrading the raw materials, to allow the use of solvent(s) or transfer agents with low boiling point facilitating their removal after synthesis, or to reduce the impact of the synthesis on the environment and on production costs.

The invention also concerns a method for coating a food product, in particular a cheese and more particularly a firm cheese, comprising a step to apply the composition of the invention, typically a coating of the invention, onto a whole food product or a portion of a food product.

According to one particular embodiment, the above-mentioned application step consists of immersing the product to be coated in the composition in the viscous state, this immersion step optionally being conducted in 2 operations. It is followed by a cooling step of the coated product, by immersing in iced water then placing in a cold room at a temperature of 3° C., for a time possibly ranging from 12 h to 60 h. Finally, the coated product is stored at between 2° C. and 6° C. until consumption of the product.

According to one particular embodiment, the above-mentioned application step consists of moulding the product to be coated with the composition in the molten and highly viscous state, typically in the form of a melted viscous wax. It is followed by a cooling step of the coated product by immersing in iced water then placing in a cold room at a temperature of 3° C., for a time possibly ranging from 12 h to 60 h. Finally, the coated product is stored at between 2° C. and 6° C. until consumption of the product.

The invention also concerns a coated food product, in particular a coated cheese, able to be obtained using the above-mentioned process.

The invention also concerns the use of a composition according to the invention, typically a coating wax of the invention, to coat a food product, in particular a cheese and more particularly a firm cheese.

EXPERIMENTAL PART

Example 1

Coating n °1

As particularly advantageous composition, the composition can be cited which results from the copolymerization of a first block of vinyl stearate (CAS N° 111-63-7) and of a second block of vinyl dodecanoate (CAS N° CAS 2146-71-6) in proportions between 40:60 and 60:40. Synthesis is conducted at 80° C. in an inert atmosphere (nitrogen) and under permanent agitation. The first monomer is placed in the reactor with the radical initiator (lauroyl peroxide) and the reaction takes place immediately. When the quantity of monomer only represents 10% of its initial value, the second monomer is added to the reactor and the reaction continued until completion. The quantity of residual monomers is determined by Fourier Transform Infrared Spectroscopy (sample deposited on diamond Attenuated Total Reflection attachment, Spectrum 100 Perkin Elmer apparatus, 16 scans, 400-4000 $cm^{-1}$, resolution 4 $cm^{-1}$: the kinetics and reaction yield are monitored from the surface areas of the absorption bands located at 1760 cm$^{-1}$ for the ester function of the monomer, at 1724 cm$^{-1}$ for the ester function of the polymer and at 1646 cm$^{-1}$ for the vinyl function) and the synthesis is halted when the monomer concentration falls to below 0.5% of the initial concentration (detection limit). The residual monomers are removed by heating in vacuo (<10 mbar-100° C.) for 24 h. The number average molecular weight ($M_n$) of the polymer is determined by size exclusion chromatography (ISO 16014). The polymer obtained in this precise case has a number average molecular weight ($M_n$) of less than 100 000 Da. The product obtained is analysed under differential scanning calorimetry (DSC2920 TA Instrument, indium calibration). The sample is first heated to 120° C. to delete its thermal history then cooled to −100° C. at 4° C./min. The melt temperatures (tips of the melt peaks) are then determined after heating at 4° C./min from −100° C. to 120° C.

The polymer has a melt temperature of 47° C. for the block containing long chain fatty acids and a melt temperature of −2° C. for the block of short chain fatty acids. A third melt region of low intensity is visible. With the two other melt regions it indicates the presence of a third block in the polymer. The block at −2° C. corresponds to poly(vinyl dodecanoate), the block at 47° C. to the poly(vinyl stearate) and the third located between 5° C. and 30° C. to a small block of poly(vinyl dodecanoate-co-vinyl stearate) produced during the incorporation of the second monomer whereas there still remained 10% of the first monomer. The enthalpy of fusion of this polymer taken in the range of use i.e. 0° C. to 95° C. is of the order of 50 J/g compared with a magnitude of 150 J/g for a wax of mineral origin (waxes analysed under DSC under the same cooling conditions from the molten state to delete their thermal history followed by same heating conditions).

This composition (n °1) was tested as cheese coating using a manual immersion deposit method at a temperature of between 80° C. and 95° C., with positive results comparable with a reference coated with mineral wax. The weight of the coatings was 4 g for a cheese of 20 g. An opening strip was placed between the wax and the cheese to allow the opening of the wax by tearing and pulling away. For the two types of coating (the present invention and the reference) the opening was clean-cut and, after opening, the wax formed two solid malleable semi-shells. The wax of the present invention remained more plastic in the sense that its molecular weight is 100 000 Da against less than 1500 Da for the reference.

The composition of coating n °1 has all the characteristics of a coating wax for food products.

Example 2

Coating n °2

Another advantageous coating composition consists of conducting the synthesis under the same conditions as previously of 2 blocks of monomers, for example a first block of vinyl stearate (50% of total weight) and a second block (50% of total weight) formed of a mixture in defined proportions of 80% vinyl dodecanoate and 20% isomers of vinyl neodecanoate (CAS N° 51000-52-3). The first block of vinyl stearate maintains a melt temperature of 47° C. whilst the second block has a melt temperature of −8° C. and a much lower enthalpy of fusion than for an equivalent block of poly(vinyl dodecanoate). This property is due to the fact that the poly(vinyl neodecanoate) is an amorphous polymer. The statistical copolymerization that is generated by mixing the vinyl dodecanoate and vinyl neodecanoate perturbs the crystallinity of the vinyl dodecanoate in the polymer, hence a lower enthalpy of fusion (less crystallinity) and a lower melt temperature. Similarly, the intermediate block between the two main blocks (10% residue of vinyl stearate at the time of incorporation during synthesis of the mixture for the second block) is also significantly perturbed since it no longer crystallizes. The mechanical behaviour of the corresponding coating (n °2) is therefore more regular between the low temperatures of use (storage) and the highest (30-35° C. when held in the hand). It is has similar characteristics to coating n °1, i.e. it is more plastic than the mineral wax, it forms two semi-shells after opening but it is a little more flexible than n °1 at low temperature.

The composition of coating n °2 has all the characteristics of a coating wax for food products.

Depending on the type of monomer blocks used, the proportions of the mixture and the conditions of synthesis, coating compositions are therefore obtained whose thermal properties can be modified (temperature and enthalpy of fusion) to obtain a product meeting all the functionalities of the coating wax.

The mixing of two homopolymers formed of two different monomers leads to the same thermal behaviour as for the polymers previously cited. Therefore the mixture of poly(vinyl stearate) (coating n °3), of poly(vinyl dodecanoate) (coating n °4) and of a cohesion polymer (coating n °5) has similar thermal properties to coating n °1: a melting point at −2° C. and a second at 50° C. The purpose of the cohesion polymer is to make compatible the amorphous and crystalline phases of the homopolymers in the mixture. However, this coating leads more easily to separation phenomena of the amorphous and crystalline phases (de-mixing) at a temperature higher than 0° C., the poly(vinyl dodecanoate) being amorphous. In the materials of coatings n °1 and n °2, these amorphous and crystalline phases are chemically bonded together which reduces and eliminates this risk of phase separation.

It can be noted however, as shown in Table 1, that coatings n °3 and n °4 formed of pure homopolymers do not allow the mechanical properties to be reached that are required for coating.

These examples clearly show the need to operate with <<block>> polymers to produce a coating having adequate properties.

Example 3

Coating n °6

Another coating composition is the composition resulting from the copolymerization of a first block of stearyl acrylate (CAS N° 4813-57-4) and of a second block of dodecyl acrylate (CAS N° CAS 2156-97-0) in proportions between 40:60 and 60:40. Synthesis is conducted by controlled atom-transfer radical polymerization (ATRP) in an inert atmosphere (nitrogen) and under permanent agitation. The residual monomers are removed by precipitation in a solvent which is then removed in vacuo. The number average molecular weight ($M_n$) of the polymer is determined by size exclusion chromatography (ISO 16014). The polymer obtained in this precise case has a number average molecular weight ($M_n$) of less than 40 000 Da. The product obtained was analyzed by differential scanning calorimetry (DSC2920 TA Instrument, indium calibration). The sample was first heated to 120° C. to delete its thermal history then cooled to −100° C. at 4° C./min. The melt temperatures (tips of the melt peaks) were then determined after heating at 4° C./min from −100° C. to 120° C.

The polymer exhibits a melt temperature of 45° C. for the block containing long chain fatty acids and a melt temperature of 8° C. for the block of short chain fatty acids. At between about 15° C. and about 40° C., the wax composition n °6 displays the required properties for a coating wax.

TABLE 1

Summary of the coatings and their properties

| Coating | Melt temperatures of the main melt peaks (° C.) | Mechanical properties of the wax | Opening properties |
|---|---|---|---|
| Mineral wax (Reference) | 48-52° C. | Solid, waxy, malleable | Clean-cut |
| Coating n °1 | −2° C. and 47° C. | Waxy - Plastic | Clean-cut and more resistant than the reference |
| Coating n °2 | −8° C. and 47° C. | Waxy - Plastic | Clean-cut and slightly more resistant than the reference |
| Poly (vinyl stéarate) n °3 | 50° C. | Solid, very brittle | Brittle - Flakes |
| Poly (vinyl dodecanoate) n °4 | −2° C. | Gum - Very viscous- Very sticky | Drips off a few hours after coating |
| Coating n °5 | −2° C. and 50° C. | Solid, phase separation over time, tacky nodules | Tendency to flake, presence of amorphous polymer strands |
| Coating n °6 | 8° C. and 45° C. | Waxy - Malleable at ambient temperature | Clean-cut at ambient temperature |

The invention claimed is:

1. A coating wax for food product, comprising at least one block copolymer formed of:
   at least one block polymer (A) derived from the polymerization of at least two monomers ($M_A$), the same or different, derived from long chain fatty acids, the said long chain comprising 14 to 34 carbon atoms, and of
   at least one block polymer (B), different from (A), derived from the polymerization of at least two monomers ($M_B$), the same or different, derived from short chain fatty acids having carbon atoms selected from the group consisting of $C_8$, $C_9$, $C_{10}$ or $C_{12}$;
   said coating wax containing no water.

2. The coating wax according to claim 1, wherein the food product is cheese.

3. The coating wax according to claim 1, wherein the long chain comprises from 14 to 22 carbon atoms.

4. The coating wax according to claim 1, wherein the fatty acid derived monomer ($M_A$) or ($M_B$) meets the following general formula (I):

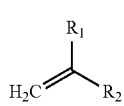

wherein:
   $R_1$ is a hydrogen atom or a straight-chain or branched alkyl chain comprising 1 to 6 carbon atoms;
   $R_2$ is a group $(CH_2)_p$—$OCOR_3$, $(CH_2)_p$—$OR_4$, or $COOR_5$, with p=0 or 1;
   $R_3$, $R_4$ and $R_5$ are the same or different and represent branched or straight-chain alkyl chains derived from saturated fatty acids.

5. The coating wax according to claim 1, wherein the weight proportion of the two monomers ($M_A$) and ($M_B$) is between 5:95 and 95:5.

6. A coated food product, in particular a coated cheese, able to be obtained using the process according to claim 5.

7. The coating wax according to claim 1, wherein the weight proportion of the two monomers ($M_A$) and ($M_B$) is between 20:80 and 80:20.

8. The coating wax according to claim 1, wherein the molecular weight of the block copolymer is higher than 1000 Da and lower than 100 000 Da.

9. The coating wax according to claim 1, wherein the molecular weight of the block copolymer is lower than 50 000 Da.

10. The coating wax according to claim 1, further comprising an additive whose weight proportion is less than 30% of the total weight of the coating wax.

11. The coating process according to claim 1 wherein the application step is a moulding step of the product to be coated with the coating wax in the molten and highly viscous state, and wherein this moulding step is followed by a cooling step of the coated product.

12. A process for coating a food product, comprising a step to apply to a whole food product or to a portion of a food product a coating wax, said coating wax comprising at least one block copolymer formed of:
   at least one block polymer (A) derived from the polymerization of at least two monomers ($M_A$), the same or different, derived from long chain fatty acids, the said long chain comprising 14 to 34 carbon atoms, and of
   at least one block polymer (B), different from (A), derived from the polymerization of at least two monomers ($M_B$), the same or different, derived from short chain fatty acids having carbon atoms selected from the group consisting of $C_8$, $C_9$, $C_{10}$ or $C_{12}$ such as defined in claim 11
   said coating wax containing no water.

13. The coating process according to claim 12 wherein the application step is an immersion step of the product to be coated in the coating wax in the viscous state, and wherein the application step is followed by a cooling step of the coated product.

14. The coating process according to claim 12 wherein the application step is conducted in two operations.

15. The coating process according to claim 12, wherein the food product is cheese.

16. The coating process according to claim 12, wherein the long chain comprises from 14 to 22 carbon atoms.

17. The coating process according to claim 12, wherein the fatty acid derived monomer ($M_A$) or ($M_B$) meets the following general formula (I):

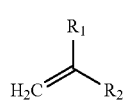

wherein:
   $R_1$ is a hydrogen atom or a straight-chain or branched alkyl chain comprising 1 to 6 carbon atoms;
   $R_2$ is a group $(CH_2)_p$—$OCOR_3$, $(CH_2)_p$—$OR_4$, or $COOR_5$, with p=0 or 1;
   $R_3$, $R_4$ and $R_5$ are the same or different and represent branched or straight-chain alkyl chains derived from saturated fatty acids.

18. The coating process according to claim 12, wherein the weight proportion of the two monomers ($M_A$) and ($M_B$) is between 5:95 and 95:5.

19. The coating process according to claim 12, wherein the weight proportion of the two monomers ($M_A$) and ($M_B$) is between 20:80 and 80:20.

20. The coating process according to claim 12, wherein the molecular weight of the block copolymer is higher than 1000 Da and lower than 100 000 Da.

21. The coating process according to claim 12, wherein the molecular weight of the block copolymer is lower than 50 000 Da.

22. The coating process according to claim 12, wherein the coating wax further comprises an additive whose weight proportion is less than 30% of the total weight of the coating wax.

\* \* \* \* \*